United States Patent
Yim

(10) Patent No.: US 6,544,024 B1
(45) Date of Patent: Apr. 8, 2003

(54) APPARATUS FOR MOMENTARILY HEATING THE SURFACE OF A MOLD

(75) Inventor: Sook Jia Yim, Seoul (KR)

(73) Assignee: Myung-Ho Kang, Seoul (KR)

( * ) Notice: Subject to any disclaimer, the term of this patent is extended or adjusted under 35 U.S.C. 154(b) by 227 days.

(21) Appl. No.: 09/694,409

(22) Filed: Oct. 23, 2000

(30) Foreign Application Priority Data

| Jan. 13, 2000 | (KR) | 2000-1521 |
| May 29, 2000 | (KR) | 2000-29088 |
| Aug. 24, 2000 | (KR) | 2000-49277 |
| Sep. 22, 2000 | (KR) | 2000-55868 |

(51) Int. Cl.$^7$ .............................................. B29C 45/78
(52) U.S. Cl. ........................ 425/144; 425/547; 425/548
(58) Field of Search ................................ 425/143, 144, 425/547, 548

(56) References Cited

U.S. PATENT DOCUMENTS 5,055,025 A * 10/1991 Muller ........................ 425/144
6,048,189 A * 4/2000 Kurihara et al. ............ 425/149

* cited by examiner

*Primary Examiner*—Tim Heitbrink
(74) *Attorney, Agent, or Firm*—Abelman, Frayne & Schwab

(57) ABSTRACT

Disclosed herein is a system for momentarily heating the surface of a mold and system thereof. The system comprises a casting material feeder, upper and lower molds, an injection molding control, an air and gaseous fuel mixture and supply unit, an interface and a control panel. The casting material feeder serves to supply molten casting material. The upper and lower molds serve to form a predetermined shaped cast. The injection molding control serves to control the upper mold and the lower mold. The air and gaseous fuel mixture and supply unit serves to supply compressed air and gaseous fuel simultaneously or selectively. The gaseous fuel mixture and supply control serves to control the operation of the air and gaseous fuel mixture and supply unit. The interface serves to interface the injection molding control and the gaseous fuel mixture and supply control. The control panel serves to visually display the control, condition and operation of the components of the system.

10 Claims, 12 Drawing Sheets

Fig. 3a
Fig. 3b
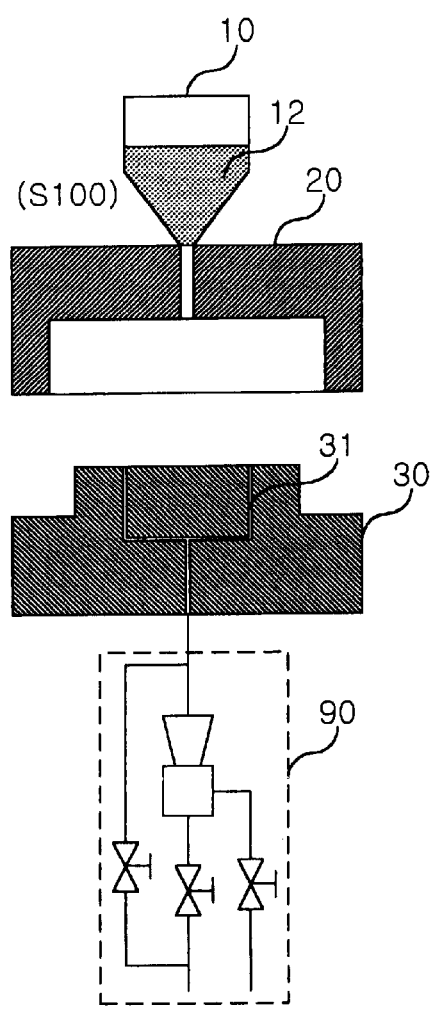
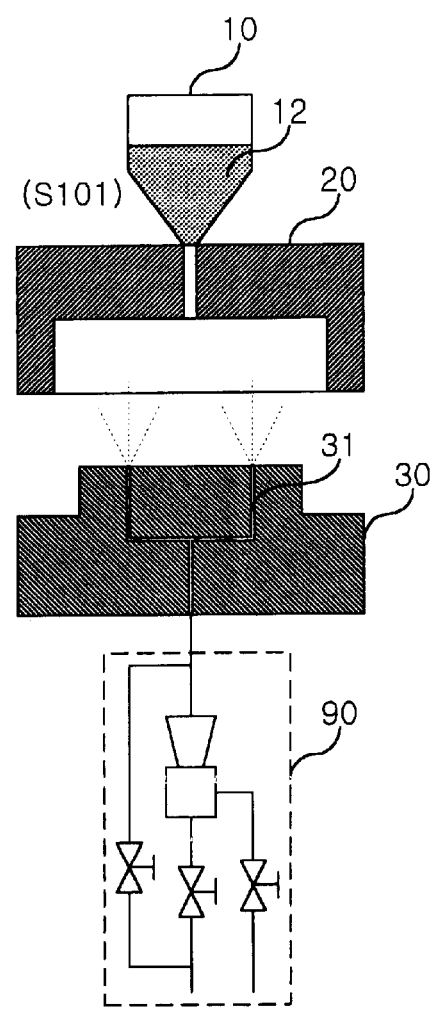

Fig. 5a
Fig. 5b
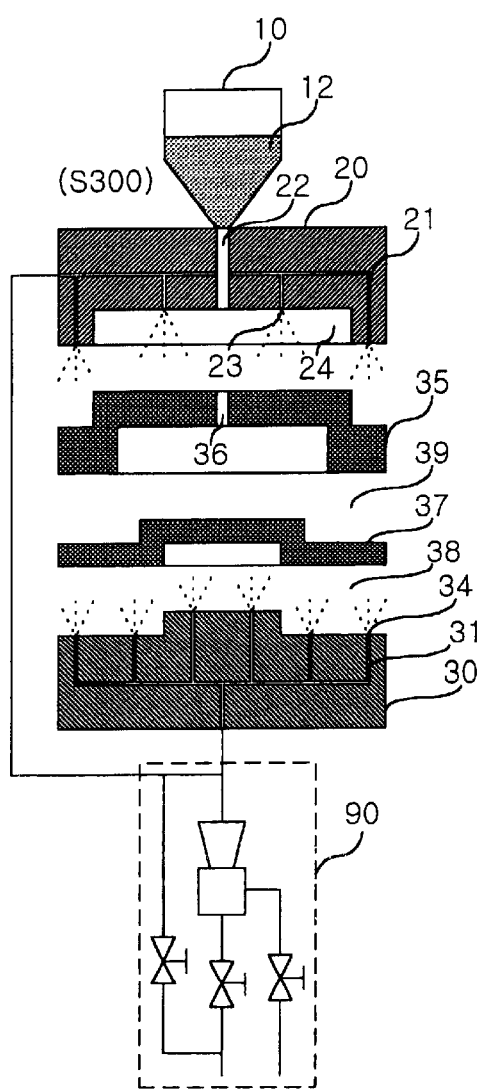
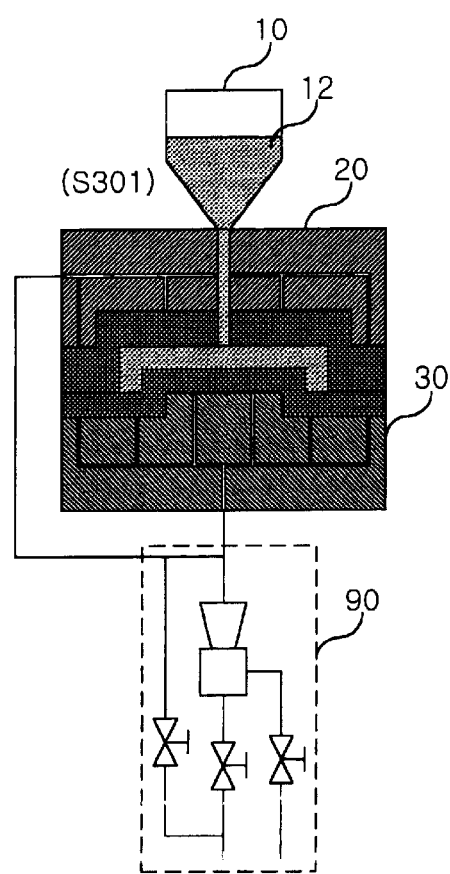

APPARATUS FOR MOMENTARILY HEATING THE SURFACE OF A MOLD

BACKGROUND OF THE INVENTION

1. Field of the Invention

The present invention relates generally to methods for momentarily heating the surface of a mold and system thereof, and particularly to a method for momentarily heating the surface of a mold and system thereof, which is capable of momentarily heating the surface of the mold prior to injection molding and cooling a molded product immediately after the molding, thereby improving the quality of products in appearance, preserving the physical and thermal properties of resin in the products, and increasing the productivity of a manufacturing process of the products for the reduction of the manufacturing cost of the products.

2. Description of the Prior Art

In a technical field where resin (such as synthetic resin, plastics or the like) products are manufactured, various attempts have been made to momentarily heat a mold to the same temperature as that of resin while the cavity of the mold is being filled with the resin, and to rapidly cool the mold after the cavity of the mold is filled with the resin. The object of these attempts is to increase the quality of products in appearance, to improve the strength and thermal properties of the products and to increase the productivity of the manufacturing process of the products for the reduction of the manufacturing costs of the products.

German Pat. Appln. No. 297 08 721.5 and PCT Appln. No. WO 98/51460 disclose a mold capable of being temporarily heated by the flame of gaseous fuel and synthetic resin forming method thereof. According to the above described patents, a synthetic resin injecting mold process is automated and the molded products of synthetic resin may is manufactured continuously.

However, according to the above-described patents, since a molded product cannot be cooled immediately after the forming of the product, the quality of the molded product is reduced in appearance, the strength and thermal properties of the injection-molded product are deteriorated and the productivity of the molding process is reduced.

SUMMARY OF THE INVENTION

Accordingly, the present invention has been made keeping in mind the above problems occurring in the prior art, and an object of the present invention is to provide a method for momentarily heating the surface of a mold, which allows the mold to be filled with molten resin for injection molding after the preheating of the mold to a predetermined temperature and allows an injection-molded product to be cooled upon the completion of the injection molding, thereby increasing the quality of the injection-molded product in appearance and improving the strength and thermal properties of the injection-molded product.

Another object of the present invention is to provide a system for momentarily heating the surface of a mold, which comprises upper and lower molds for forming resin and performing the heating of the upper and lower molds, a supply unit for supplying air and gaseous fuel, a safety unit for preventing the danger of gas explosion, and a control unit for controlling the operation of the above components.

A further object of the present invention is to provide a method for momentarily heating the surface of a mold and system thereof, in which one or more cores are disposed between its upper and lower molds, the cores are momentarily heated using gaseous fuel or an induction heater, and heating and cooling are performed in the process of injection molding, thereby improving the quality of an injection-molded product.

In order to accomplish the above object, the present Invention provides a method for momentarily heating a surface of a mold, comprising the steps of: opening upper and lower molds of the mold, and supplying gaseous fuel; injecting and igniting the gaseous fuel from the lower mold after allowing the upper and lower molds to come close to each other at a predetermined distance; heating the upper mold for a predetermined time period; filling a forming space between the upper and lower molds with molten material through the upper mold immediately after stopping heating and closing the upper and lower molds; cooling a molded product by injecting compressed air to the molded product after allowing the upper and lower molds to be opened at a predetermined distance; and ejecting the molded product from the upper and lower molds after allowing the upper and lower molds to be completely opened.

In addition, the present invention provides a system for momentarily heating the surface of a mold, comprising: a casting material feeder for supplying molten casting material; upper and lower molds for forming a predetermined shaped cast; an injection molding control for controlling the upper mold and the lower mold; an air and gaseous fuel mixture and supply unit for supplying compressed air and gaseous fuel simultaneously or selectively; a gaseous fuel mixture and supply control for controlling the operation of the air and gaseous fuel mixture and supply unit; an interface for interfacing the injection molding control and the gaseous fuel mixture and supply control; and a control panel for visually displaying the control, condition and operation of the components of the system.

BRIEF DESCRIPTION OF THE DRAWINGS

The above and other objects, features and other advantages of the present invention will be more clearly understood from the following detailed description taken in conjunction with the accompanying drawings, in which:

FIGS. 3a to 3f are process charts showing the method for temporarily heating the surface of a mold using the frame of gaseous fuel in accordance with an embodiment of the present invention;

FIGS. 5a to 5d are process charts showing the method for temporarily heating the surface of a mold using the frame of gaseous fuel in accordance with a further embodiment of the present invention;

DESCRIPTION OF THE PREFERRED EMBODIMENTS

Figure 1:
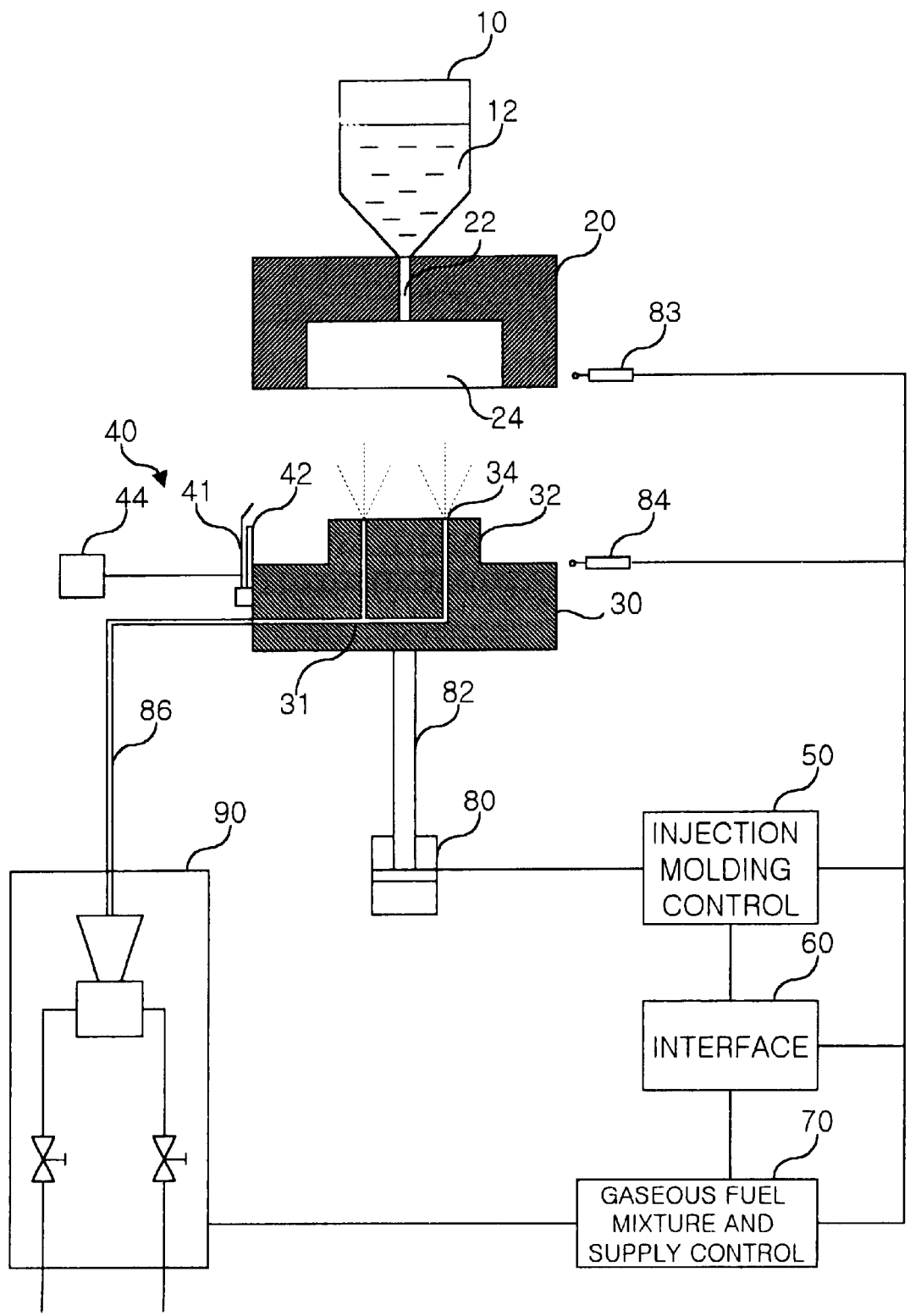
FIG. 1 is a schematic diagram showing a system for momentarily heating the surface of a mold using the flame of gaseous fuel in accordance with the present invention.

Reference now should be made to the drawings, in which the same reference numerals are used throughout the different drawings to designate the same or similar components.

Figure 2:
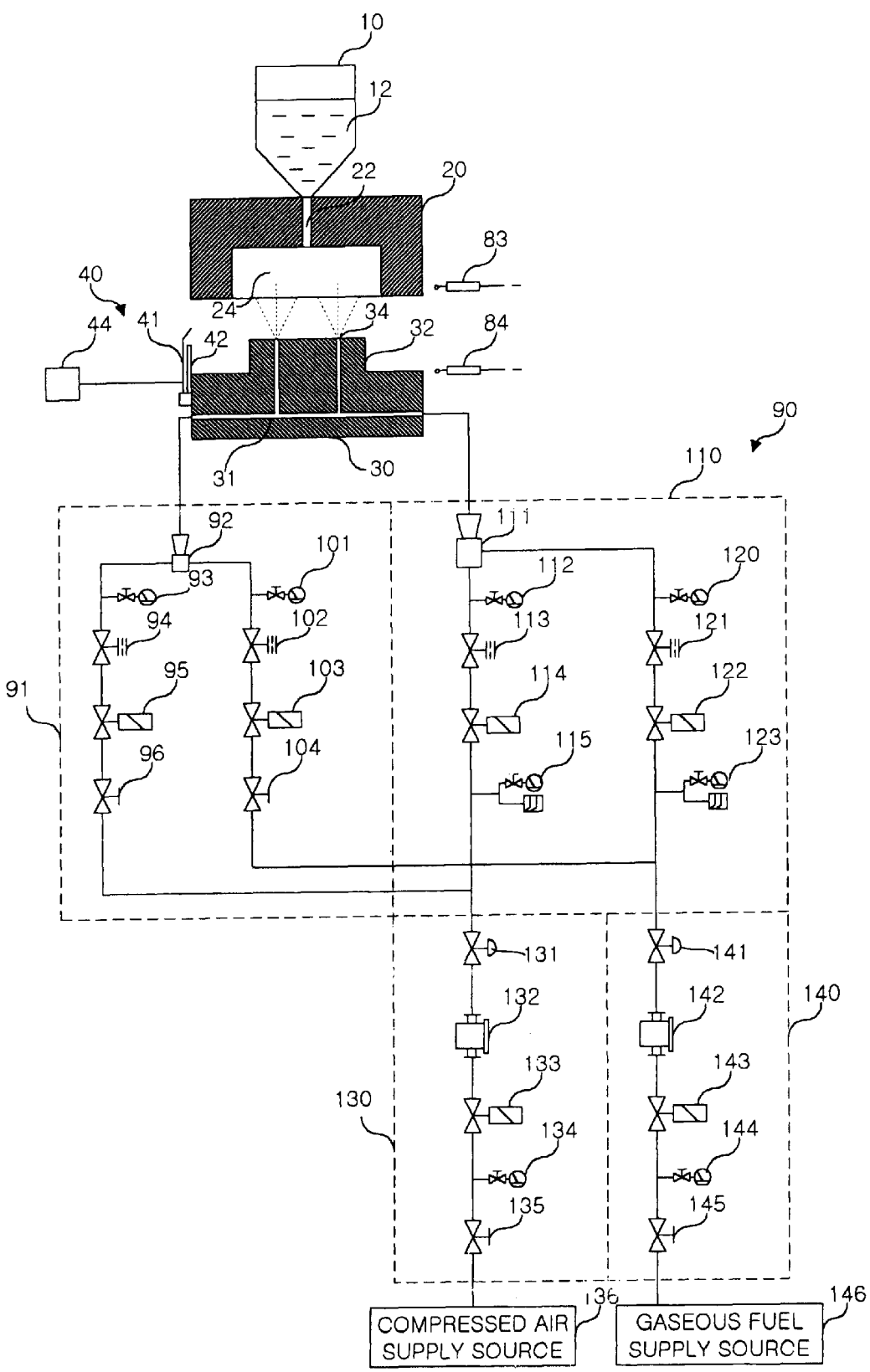
FIG. 2 is a diagram showing piping for supplying air and gaseous fuel to the main body of the system in detail.
Figure 3C:
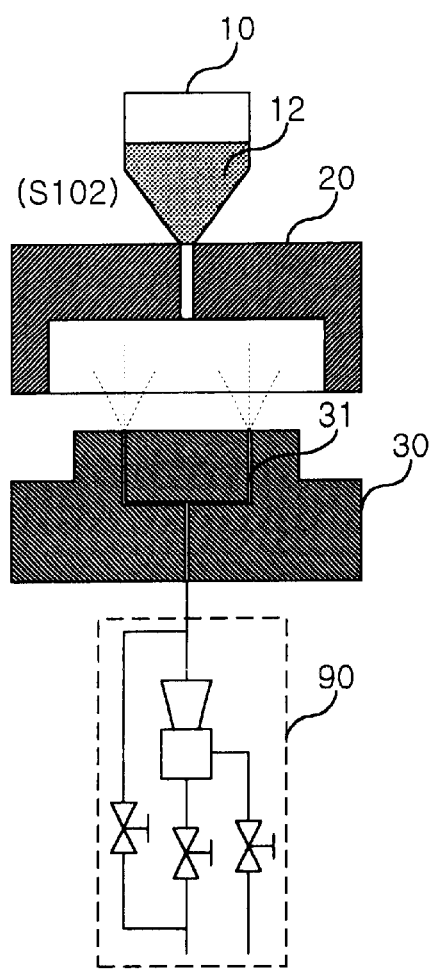
Figure 3D:
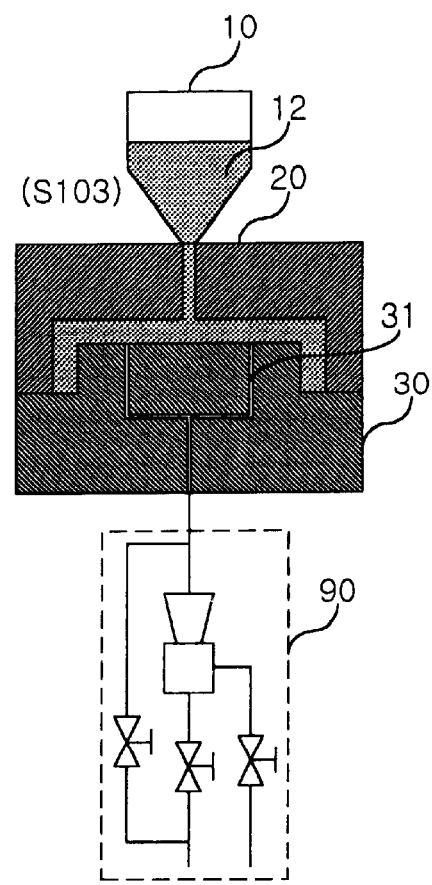
Figure 3E:
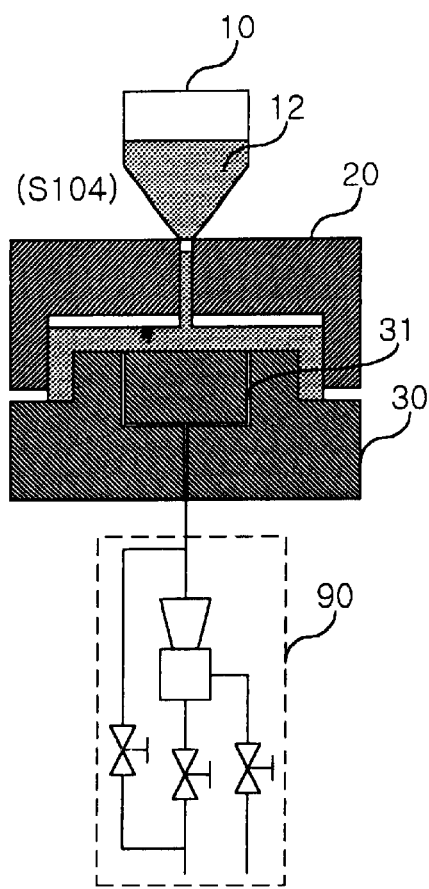
Figure 3F:
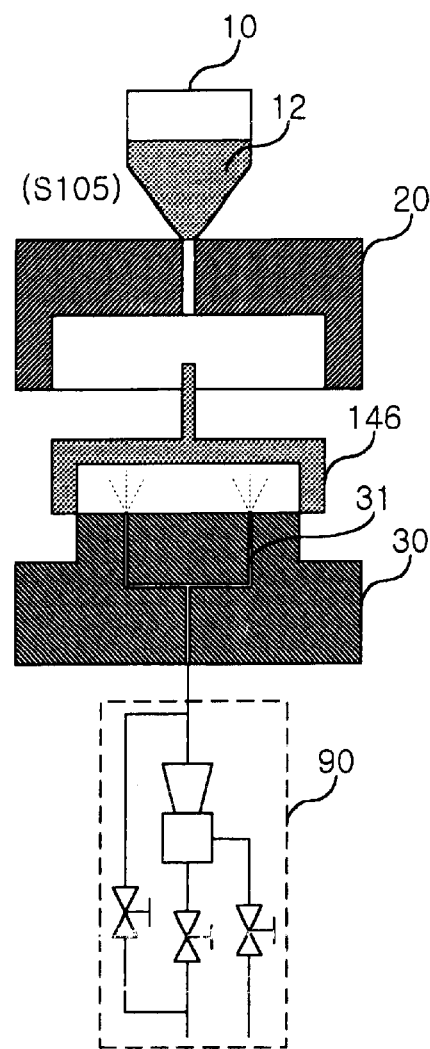
Figure 4A:
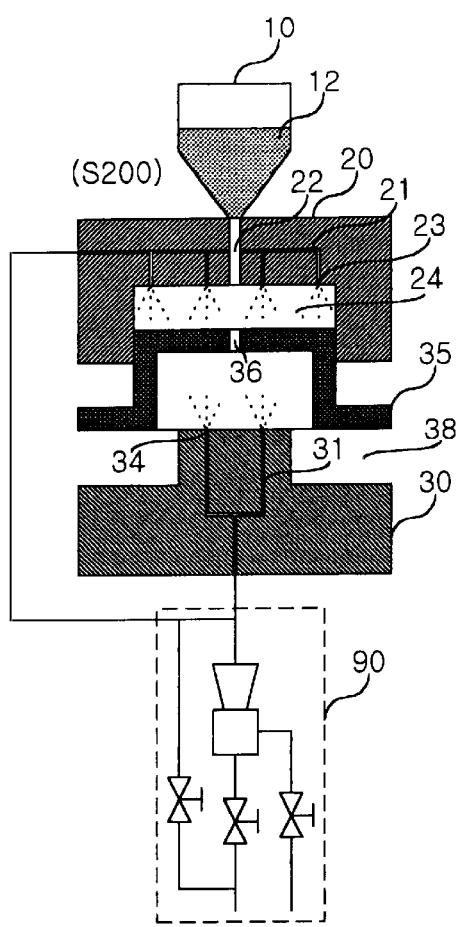
FIGS. 4a to 4d are process charts showing the method for temporarily heating the surface of a mold using the frame of gaseous fuel in accordance with another embodiment of the present invention.
Figure 4B:
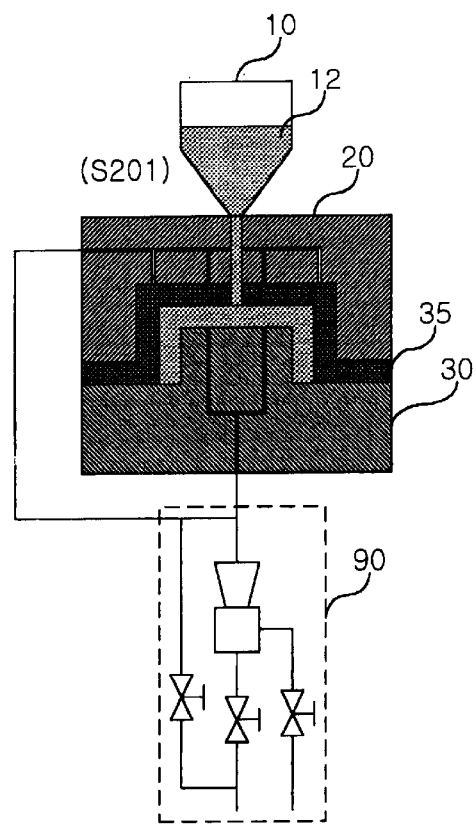
Figure 4C:
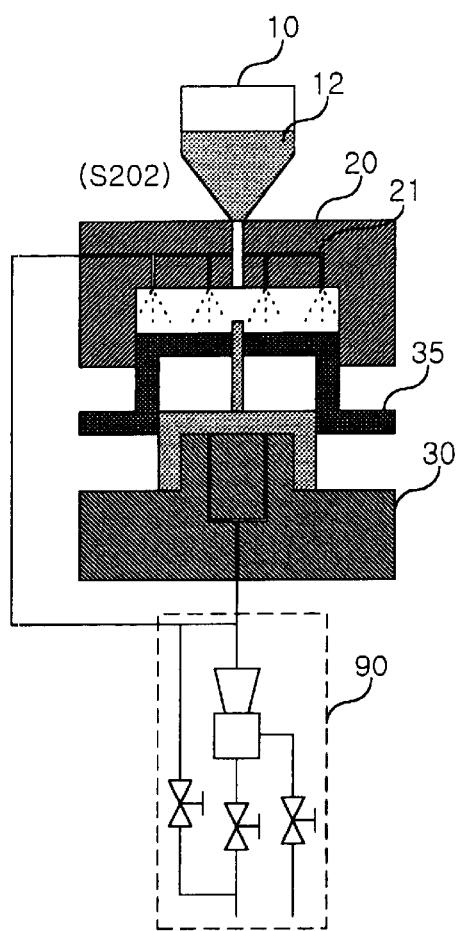
Figure 4D:
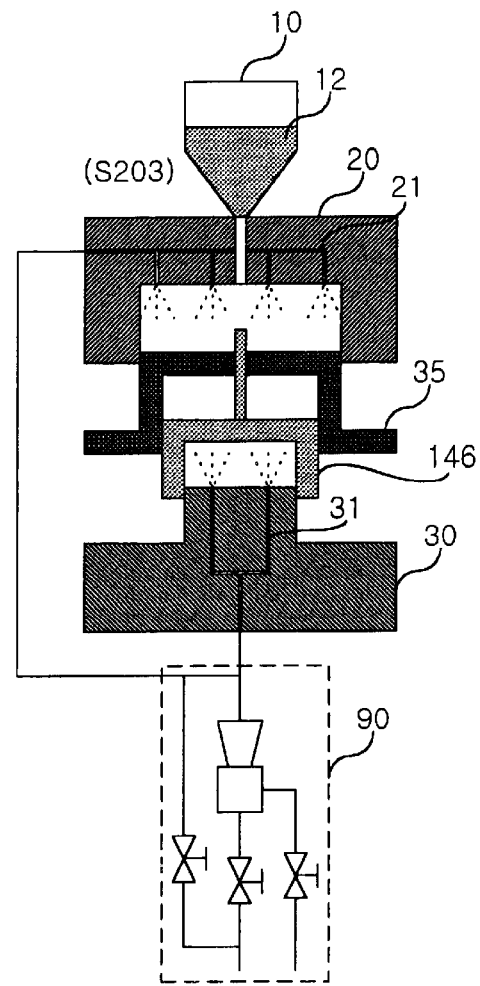
Figure 5C:
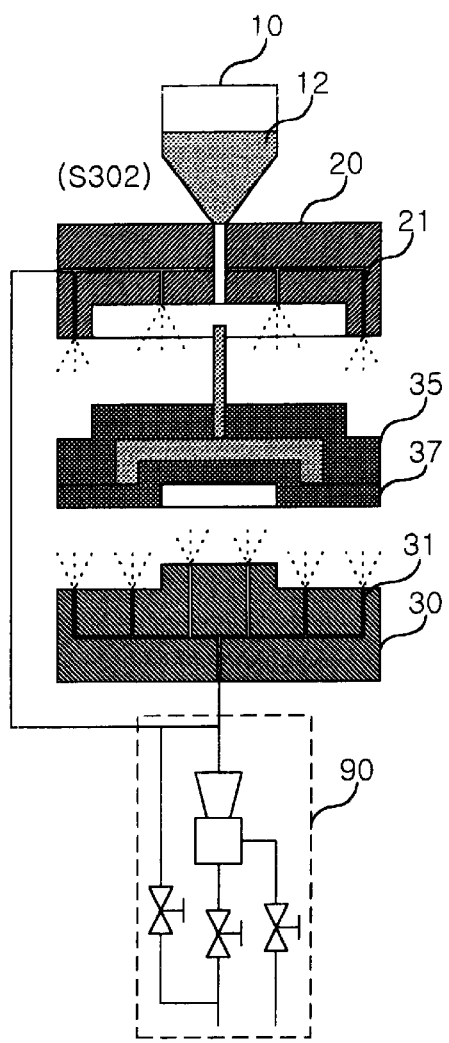
Figure 5D:
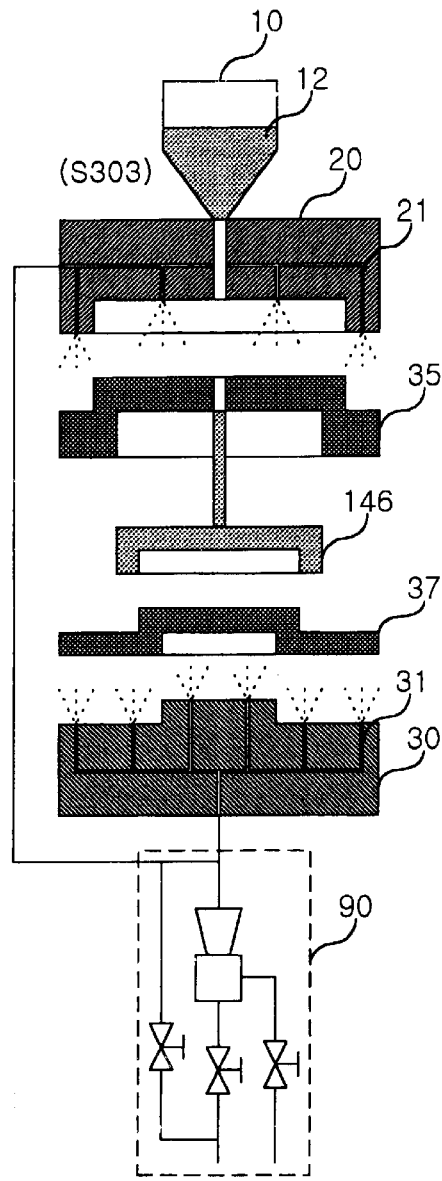

FIG. 1 is a schematic diagram showing a system for momentarily heating the surface of a mold using the flame of gaseous fuel in accordance with the present invention. FIG. 2 is a diagram showing piping for supplying air and gaseous fuel to the main body of the system in detail.

Reference numeral 10 designates a casting material feeder for supplying molten casting material. The casting material feeder 10 supplies injectable material, such as synthetic resin or metal.

An upper mold 20 is fixed to the lower end of the casting material feeder 10 under the casting material feeder 10. The upper mold 20 has a casting material supply hole 22 for supplying casting material from the casting material feeder 10 to the upper mold 20, a cavity 24 for forming the casting material into a predetermined-shaped cast. The upper mold 20 is provided with a limit switch 83 for sensing the position of the upper mold 20.

A lower mold 30 is disposed under the upper mold 20. The lower mold 30 comprises a mold portion 32 for insertion into the cavity 24 of the upper mold 20 to form the casting material into a predetermined-shaped cast, a lower mold supply conduit 31 formed in the lower mold 30 to supply mixed gaseous fuel and compressed air, a plurality of discharge holes 34 for heating and cooling the upper mold 20 using the mixed gaseous fuel and the compressed air supplied through the lower mold supply conduit 31, an ignition unit 40 for igniting gaseous fuel injected by an igniter 41 using high voltage current generated by a high voltage generator 44 and sensing gaseous fuel flame by means of a flame sensor 42, a limit switch 84 for sensing the position of the lower mold 30, an air and gaseous fuel mixture and supply unit 90 for supplying air or mixed gaseous fuel supplied through an air and mixed gaseous fuel supply conduit 86, and an elevating cylinder 80 including an elevating shaft 82 for selectively lifting or lowering the lower mold 30 by the control of an injection molding control 50. The discharge holes 34 are constructed in the form of slits, respectively have widths of 0.01 to 0.1 mm, and are distributed on the surface of the lower mold 30 in accordance with the shape of the cast.

Although not depicted in the drawing, conduits for supplying air and gaseous fuel and a coolant supply conduit for supplying coolant are provided in the lower mold 30.

The upper and lower molds 20 and 30 are separately formed. The upper mold 20 and/or the lower mold 30 may be provided with additional parts necessary for injection molding.

The injection molding control 50 controls the upper and lower molds 20 and 30. In detail, the injection molding control 50 controls the mechanical operation for an injection molding process.

The air and gaseous fuel mixture and supply unit 90 serves to supply compressed air and gaseous fuel simultaneously or selectively, and comprises a variety of pipelines for supplying air and/or gaseous fuel and a variety of valves and gauges for controlling the flow of air and/or gaseous fuel. The air and gaseous fuel mixture and supply unit 90 is divided into an air and gaseous fuel supply line 91 for ignition and an air and gaseous fuel supply line 110 for heating. A compressed air supply line 130 for supplying compressed air and a gaseous fuel supply line 140 for supplying gaseous fuel are respectively connected to the air and gaseous fuel mixture and supply unit 90. A compressed air supply source 136 for supplying compressed air and a gaseous fuel supply source 146 for supplying gaseous fuel are respectively connected to the compressed air supply line 130 and the gaseous fuel supply line 140.

The air and gaseous fuel supply line 91 for ignition includes an air and gaseous fuel mixture element 92 for ignition, an air supply line for ignition and a gaseous fuel supply line for ignition. The air supply line for ignition includes a first pneumatic pressure gauge 93 for measuring the pressure of supplied air, a first needle valve 94 for preventing compressed air from flowing backward, and a first solenoid valve 95 for interrupting the supply of compressed air and a first manual valve 96 for regulating the amount of supplied compressed air. The gaseous fuel supply line for ignition includes a first fluidic pressure gauge 101 for measuring the pressure of supplied gaseous fuel, a second needle valve 102 for preventing gaseous fuel from flowing backward, and a second solenoid valve 103 for interrupting the supply of gaseous fuel and a second manual valve 104 for regulating the amount of supplied gaseous fuel. The air and gaseous fuel mixture element 92 for ignition serves to mix air and gaseous fuel supplied through the air and gaseous fuel supply lines for ignition.

The air and gaseous fuel supply line 110 for heating includes an air and gaseous fuel mixture element 111 for heating, an air supply line for heating, and a gaseous fuel supply line for heating. The air supply line for heating includes a second pneumatic pressure gauge 112 for measuring the pressure of supplied air, a third needle valve 113 for preventing compressed air from flowing backward, and a third solenoid valve 114 for interrupting the supply of compressed air and a first pressure switch 115 for sensing the pressure of supplied compressed air and interrupting the supply of compressed air when the pressure of the supplied compressed air is not equal to a predetermined value. The gaseous fuel supply line for heating includes a second fluidic pressure gauge 120 for measuring the pressure of supplied gaseous fuel, a fourth needle valve 121 for preventing gaseous fuel from flowing backward, and a fourth solenoid valve 122 for interrupting the supply of gaseous fuel and a second pressure switch 123 for sensing the pressure of supplied compressed air and interrupting the supply of gaseous fuel when the pressure of the supplied gaseous fuel is not equal to a predetermined value. The air and gaseous fuel mixture element 111 for heating serves to mix air and gaseous fuel supplied through the air and gaseous fuel supply lines for heating.

The compressed air supply line 130 is connected to both air supply line for ignition of the air and gaseous fuel supply line 91 for ignition and the air supply line for heating of the air and gaseous fuel supply line 110 for heating, while the gaseous fuel supply line 140 is connected to both gaseous fuel supply line for ignition of the air and gaseous fuel supply line 91 for ignition and the gaseous fuel supply line for heating of the air and gaseous fuel supply line 110 for heating.

The compressed air supply line 130 serves to supply compressed air generated in and supplied from a compressed air supply 136, and the gaseous fuel line 140 serves to supply gaseous fuel supplied from the gaseous fuel supply source 146.

The compressed air supply line 130 comprises a first flux regulator 131 for manually regulating the amount of compressed air, a first filter 132 for filtering impurities included in compressed air, a fifth solenoid valve 133 for interrupting the supply of compressed air, a third pneumatic pressure gauge 134 for sensing the pressure of supplied compressed air and a fifth manual valve 135 for regulating the amount of supplied compressed air. The fuel gas supply line 140 comprises a second flux regulator 141 for manually regulating the amount of gaseous fuel, a second filter 142 for filtering impurities included in gaseous fuel, a sixth solenoid valve 143 for interrupting the supply of gaseous fuel, a fourth pneumatic pressure gauge 144 for sensing the pressure of supplied gaseous fuel and a sixth manual valve 145 for regulating the amount of supplied gaseous fuel.

A gaseous fuel mixture and supply control 70 serves to control the operation of the air and gaseous fuel mixture and supply unit 90. The gaseous fuel mixture and supply control 70 is connected to the injection molding control 50 through an interface 60, and receives signals from and transmits signals to the injection molding control 50. The gaseous fuel mixture and supply control 70 includes a microprocessor.

In addition, there may be included a safety unit that serves to automatically interrupt the supply of air and gaseous fuel when flames are not sensed by the flame sensor 42 in a predetermined time period after ignition is performed by the igniter 41 of the ignition unit 40, gas of a predetermined degree of density is detected by a gas detector (not shown) disposed near the upper and lower molds 20 and 30, or the pressures of air and gaseous fuel inputted from a first pressure switch 115 and a second pressure switch 123 are higher than a predetermined pressure.

Figure 6:
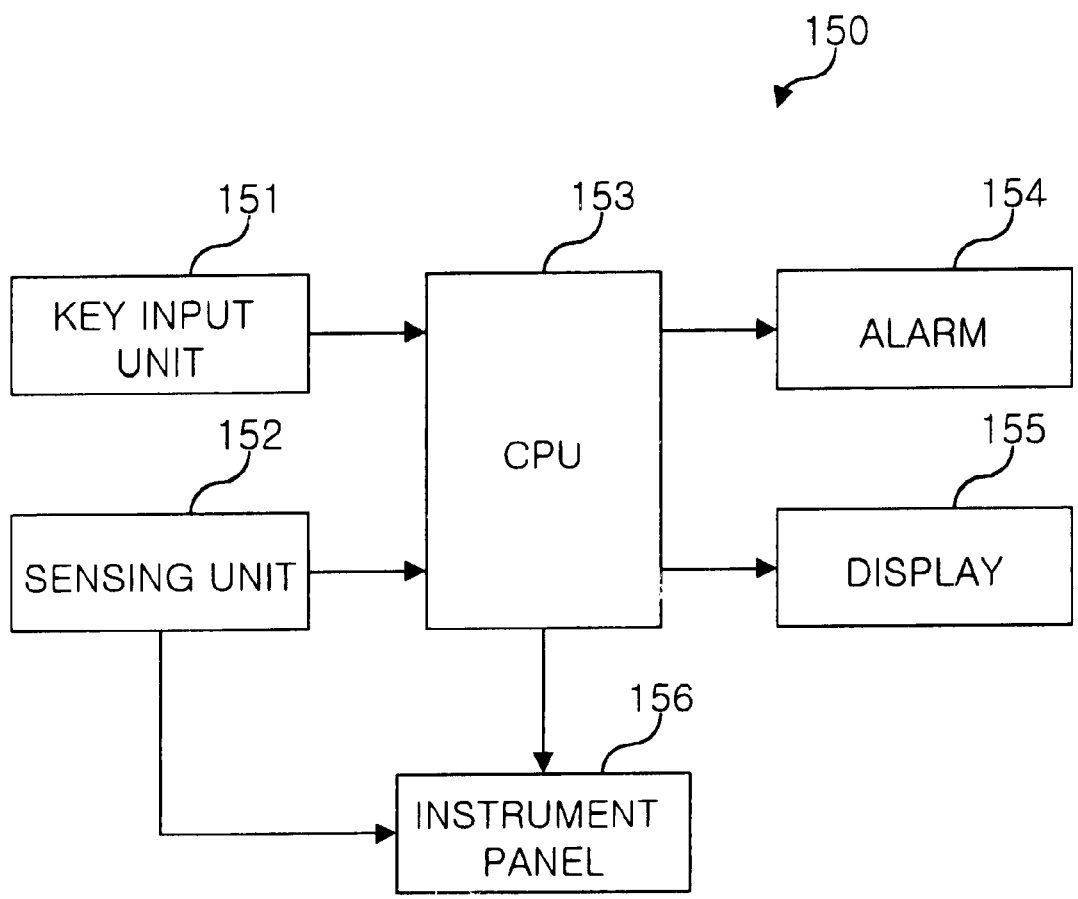
FIG. 6 is a block diagram illustrating the control panel of the system for momentarily heating the surface of a mold.

The heating system of the present invention includes a control panel for controlling the components of the system and inputting the operational conditions of the components. The control panel is illustrated as a block diagram in FIG. 6.

The control panel includes a key input unit 151, a sensing unit 152, a Central Processing Unit (CPU) 153, an alarm 154, a display 155 and an instrument panel 156.

The key input unit 151 has a plurality of keys, and serves to input various operational conditions for injection molding.

The sensing unit 152 serves to sense the various states of the system, convert a sensing signal to an electric signal and output the electric signal. The states include the elevation of the dies, the pressures and amounts of air and gaseous fuel, the leakage of gas and the like.

The CPU 153 serves to perform determination on the basis on an input signal and to output a control signal. The CPU 153 can be included in the injection molding control 50 and the gaseous fuel mixture and supply control 70.

The alarm 154 serves to warn of system error and danger situations. The alarm 154 may be activated when gas leaks or pressure variations outside predetermined limits occur.

The display 155 serves to indicate the information of the operation of the system. A user can monitor the operation of the system using the display 155.

The instrument panel 156 serves to indicate the operation of various components of the system. The instrument panel 156 may indicate the pressures of air and gaseous fuel and the state of safety.

Hereinafter, a method for momentarily heating the surface of a mold using the flame of gaseous fuel is described with reference to FIGS. 3a to 3f.

In STEP S100, the upper mold 20 and the lower mold 30 are opened at a predetermined distance and the supply of gaseous fuel is prepared.

In STEP S101, the upper mold 20 comes close to the lower mold 30 and gaseous fuel is injected and ignited. In more detail, compressed air and gaseous fuel are supplied from the compressed air supply source 136 and the gaseous fuel supply source 146 through the compressed air supply line 130 and the gaseous fuel supply line 140, enter the air and gaseous fuel supply line 91 for ignition and are mixed together while passing through the air and gaseous fuel mixture element 92, and the mixed air and gaseous fuel passes through the supply conduit 31 of the lower mold 30, is injected through the discharge holes 34 of the mold portion 32 and is ignited in the igniter 41 of the ignition unit 40 using high voltage current generated in the high voltage generator 44. If flame is not sensed by the flame sensor 42 after the ignition is performed, the supply of air and gaseous fuel is interrupted by the operation of the solenoid valves 95 and 103.

After the air and gaseous fuel supplied through and mixed in the air and gaseous fuel supply line 91 for ignition are normally injected, compressed air and gaseous fuel are supplied through and mixed in the air and gaseous fuel supply line 110 and are injected through the lower mold 30. At this time, the supply of the compressed air and gaseous fuel being supplied through the air and gaseous fuel supply line 91 for ignition is interrupted and is not supplied to the lower mold 30 anymore.

In STEP S102, the cavity 24 of the upper mold 20, which comes close to the lower mold 30 at a predetermined distance (for example, 1 to 40 cm), is heated by the gaseous fuel supplied through the air and gaseous fuel line 110 for heating and ignited, for a predetermined time (for example, about 1 to 60 seconds).

In STEP S103, after the supply of air and gaseous fuel is interrupted and flame is extinguished by the interruption of the supply of the air and gaseous fuel, the elevating shaft 82 is elevated by the operation of the elevating cylinder 80 and, accordingly, the lower mold 30 is closed by the upper mold 20. As soon as the lower mold 30 is closed by the upper mold 20, molten casting material is supplied through the casting material supply hole 22 of the upper mold 20 from the casting material feeder 10.

After the injection of the casting material is completed, STEP S104 is performed. In STEP S104, after the upper and lower molds 20 and 30 are opened at a predetermined distance (for example, in a range of 1 to 400 mm), compressed air is injected toward a formed cast (will be described) through the air and gaseous fuel supply line 110, the supply conduit 31 and the discharge holes 34, and cools the formed cast. At this time, the cooling of the formed cast is performed for, for example, 5 to 30 minutes.

Additionally, in STEP S105, after the upper and lower molds 20 and 30 are completely opened, a formed cast 146 is ejected. With this, the entire injection molding process is completed.

A method for momentarily heating the surface of a mold using the flame of gaseous fuel in accordance with a second embodiment of the present invention is described with reference to FIGS. 4a to 4d. In this case, a core 35 is disposed between the upper and lower molds 20 and 30 as an auxiliary mold for the injection molding of the cast 146.

This system, which can be applied to this method, further comprises one core 35 disposed between the upper and lower molds 20 and 30, a upper mold supply conduit 21 for supplying mixed gaseous fuel and compressed air, said upper mold supply conduit 21 being formed in the upper mold 20, a plurality of upper mold discharge holes 23 for heating and cooling the core using the mixed gaseous fuel and the compressed air supplied through the upper mold supply conduit 21, a lower mold supply conduit 31 for supplying mixed gaseous fuel and compressed air, said lower mold supply conduit 31 being formed in the lower mold 30, a plurality of lower mold discharge holes 34 for heating and cooling the core 35 using the mixed gaseous fuel and the compressed air supplied through the lower mold supply conduit 31, and an air and mixed gaseous fuel supply conduit 86 for connecting the air and gaseous fuel mixture and supply unit 90 respectively to the upper mold supply conduit 21 and the lower mold supply conduit 31.

The core 35 is formed to come into tight contact with the upper and lower molds 20 and 30 when the upper and lower molds 20 and 30 are closed, so that injection pressure is completely transmitted to the upper and lower molds, thus preventing the upper and lower molds from being damaged by high injection pressure.

The core 35 has a thickness ranging from 0.1 to 15 mm and is formed to correspond to the shape of the cast. The discharge holes 23 and 34 are constructed in the form of slits, respectively have widths of 0.01 to 5 mm and are distributed on the surface of the lower mold 30 to correspond to the shape of the cast.

The method for momentarily heating the surface of a mold in accordance with the second embodiment is different from the method for momentarily heating the surface of a mold in accordance with the first embodiment, in that the core 35 is disposed between the upper and lower molds 20 and 30, a supply line is connected to the upper mold 20 to supply mixed compressed air and gaseous fuel, and an ignition unit (not shown) identical to the ignition unit 40 (including the igniter 41, the flame sensor 42 and the high voltage generator 44) mounted to the lower mold 30 is preferably mounted to the upper mold 20. Additionally, the core 35 is provided with support means for elevating and supporting the core 35.

In STEP S200, the upper mold 20, the core 35 and the lower mold 30 are opened at predetermined distances and the supply of gaseous fuel is prepared. Thereafter, the upper mold 20, the core 35 and the lower mold 30 come close to one another at predetermined distances and gaseous fuel is injected to the core 35 from the upper and lower molds 20 and 30 and ignited. In more detail, compressed air and gaseous fuel are supplied from the compressed air supply source 136 and the gaseous fuel supply source 146 through the compressed air supply line 130 and the gaseous fuel supply line 140, enter the air and gaseous fuel supply line 91 for ignition and are mixed together while passing through the air and gaseous fuel mixture element 92, and the mixed air and gaseous fuel passes through the mixed air and gaseous fuel passes through the supply conduits 21 and 31 of the upper and lower molds 20 and 30, is injected through the discharge holes 23 and 34 and is ignited in the igniter 41 of the ignition unit 40 using high voltage current generated by the high voltage generator 44.

If flame is not sensed by the flame sensor 42 after the ignition is performed, the supply of air and gaseous fuel is interrupted by the operation of the solenoid valves 95 and 103.

After the air and gaseous fuel supplied through and mixed in the air and gaseous fuel supply line 91 for ignition are normally injected, compressed air and gaseous fuel are supplied through and mixed in the air and gaseous fuel supply line 110 and are injected through the upper and lower molds 20 and 30. At this time, the supply of the compressed air and gaseous fuel being supplied through the air and gaseous fuel supply line 91 for ignition is interrupted and is not supplied to the upper and lower molds 20 and 30 anymore. Accordingly, the cavities 24 and 38 defined by the upper and lower molds 20 and 30 and the core 35, which come close to one another at predetermined distances (for example, the distances between the upper mold 20 and the core 35 and between the core 35 and the lower mold 30 are in a range of 1 to 40 cm), are heated by the gaseous fuel supplied through the air and gaseous fuel line 110 for heating and ignited, for a predetermined time period (for example, about 1 to 60 seconds).

In STEP S201, after the supply of air and gaseous fuel supplied from the air and gaseous fuel supply line 110 is interrupted and flame is extinguished by the interruption of the supply of the air and gaseous fuel, the elevating shaft 82 is elevated by the operation of the elevating cylinder 80 and, accordingly, the core 35 and the lower mold 30 are closed by the upper mold 20. As soon as the core 35 and the lower mold 30 are closed by the upper mold 20, molten casting material is supplied through the casting material supply hole 22 of the upper mold 20 and the casting material supply hole 36 of the core 35 from the casting material feeder 10.

After the injection of the casting material is completed, STEP S202 is performed. In STEP S202, after the upper and lower molds 20 and 30 are opened away from the core 35 at predetermined distances (for example, in a range of 1 to 400 mm), compressed air is injected to the core 35 and the formed cast 146 through the air and gaseous fuel supply line 110, the supply conduits 21 and 31 and discharge holes 23 and 34 and cools the core 35 and the formed cast 146. At this time, the cooling of the formed cast 146 is performed for, for example, 5 to 30 minutes.

Additionally, in STEP S203, after the upper and lower molds 20 and 30 and the core 35 are completely opened, the formed cast 146 is ejected. With this, the entire injection mold process is completed.

A method for momentarily heating the surface of a mold using the flame of gaseous fuel in accordance with a third embodiment of the present invention is described with reference to FIGS. 5a to 5d. In this case, a plurality of cores are disposed between the upper and lower molds 20 and 30 as auxiliary molds for the injection molding of the cast 146.

The cores consist of a first core 35 in contact with the upper mold 20 and a second core 37 in contact with the lower mold 30, a casting material supply hole 36 is formed in the first core 35 to correspond to the casting material supply hole 22 in the upper mold 20, and a forming space 39 is formed between the first and second cores 35 and 37 to form casting material supplied through the casting material supply hole 36 of the first core 35.

The method for momentarily heating the surface of a mold in accordance with the second embodiment is different from the method for momentarily heating the surface of a mold in accordance with the first embodiment, in that a plurality of cores, for example, a first core 35 and a second core 37, are disposed between the upper and lower molds 20 and 30, a supply line is connected to the upper mold 20 to supply mixed compressed air and gaseous fuel, and an ignition unit (not shown) identical to the ignition unit 40 (including the igniter 41, the flame sensor 42 and the high voltage generator 44) mounted to the lower mold 30 is preferably mounted to the upper mold 20. Additionally, the first and second cores 35 and 37 are provided with support means for elevating and supporting the cores 35 and 37.

In STEP S300, the upper mold 20, the first and second cores 35 and 37 and the lower mold 30 are opened at predetermined distances and the supply of gaseous fuel is prepared. Thereafter, the upper mold 20, the first and second cores 35 and 37 and the lower mold 30 come close to one another at predetermined distances and gaseous fuel is injected to the first and second cores 35 and 37 from the upper and lower molds 20 and 30 and is ignited. In more detail, compressed air and gaseous fuel are supplied from the compressed air supply source 136 and the gaseous fuel supply source 146 through the compressed air supply line 130 and the gaseous fuel supply line 140, enter the air and gaseous fuel supply line 91 for ignition and are mixed together while passing through the air and gaseous fuel mixture element 92, and the mixed air and gaseous fuel passes through the upper and lower molds 20 and 30, is injected through the discharge holes 23 and 34 and is ignited in the igniter 41 of the ignition unit 40 using high voltage current generated by the high voltage generator 44.

If flame is not sensed by the flame sensor 42 after the ignition is performed, the supply of air and gaseous fuel is interrupted by the operation of the solenoid valves 95 and 103.

After the air and gaseous fuel supplied through and mixed in the air and gaseous fuel supply line 91 for ignition are normally injected, compressed air and gaseous fuel are supplied through and mixed in the air and gaseous fuel supply line 110 and are injected through the supply conduits 21 and 31 of the upper and lower molds 20 and 30. At this time, the supply of the compressed air and gaseous fuel being supplied through the air and gaseous fuel supply line 91 for ignition is interrupted and is not supplied to the upper and lower molds 20 and 30 anymore. Accordingly, the cavities 24 and 38 defined by the upper and lower molds 20 and 30 and the first and second cores 35 and 37, which come close to one another at predetermined distances (for example, the distances between the upper mold 20 and the first core 35, between the first core 35 and the second core 37 and between the second core 37 and the lower mold 30 are in a range of 1 to 40 cm), are heated by the gaseous fuel supplied through and injected from the air and gaseous fuel line 110 for heating and ignited, for a predetermined time period (for example, about 1 to 60 seconds).

In STEP S301, after the supply of air and gaseous fuel supplied from the air and gaseous fuel supply line 110 is interrupted and flame is extinguished by the interruption of the supply of the air and gaseous fuel, the elevating shaft 82 is elevated by the operation of the elevating cylinder 80 and, accordingly, the first and second cores 35 and 37 and the lower mold 30 are closed by the upper mold 20. As soon as the first and second cores 35 and 37 and the lower mold 30 are closed by the upper mold 20, molten casting material is supplied through the casting material supply hole 22 of the upper mold 20 and the casting material supply hole 36 of the first core 35 from the casting material feeder 10.

After the injection of the casting material is completed, STEP S302 is performed. In STEP S302, after the upper and lower molds 20 and 30 are opened away from the first and second cores 35 and 37 at predetermined distances (for example, in a range of 1 to 400 mm), compressed air is injected toward the first and second cores 35 and 37 and the formed cast 146 through the air and gaseous fuel supply line 110, the supply conduits 21 and 31 and the discharge holes 23 and 34 and cools the first and second cores 35 and 37 and the formed cast 146. At this time, the cooling of the formed cast 146 is performed for, for example, 5 to 30 minutes.

Additionally, in STEP S303, after heating is performed for a certain time period, gaseous fuel is injected from the upper and lower molds 20 and 30, is ignited and heats the first and second cores 35 and 37. While the first and second cores 35 and 37 are heated, the first and second cores 35 and 37 are separated and the cast 146 is ejected. With this, all the injection mold process is completed.

As described above, in FIGS. 3a to 3f, there is depicted the first embodiment in which no core exists between the upper and lower molds 20 and 30. In FIGS. 4a to 4d, there is depicted the second embodiment in which a single core 35 is disposed between the upper and lower molds 20 and 30. In FIGS. 5a to 5d, there is depicted the third embodiment in which a plurality of cores 35 and 37 are disposed between the upper and lower mold cores 20 and 30. Of the embodiments, it is preferable that a plurality of cores 35 and 37 are disposed between the upper and lower mold cores 20 and 30.

The cores respectively have thicknesses of 0.1 to 15 mm and are formed to corresponding to the shape of the cast. The discharge holes are constructed in the form of slits, respectively have widths of 0.01 to 5 mm and are distributed on the surface of the lower mold to correspond to the shape of the cast.

The ignition unit 40 may utilize high voltage current or an electronic spark for igniting mixed air and gaseous fuel, and preferably prepares for the failure of ignition and an accidental fire after ignition. Such an ignition unit 40 may be directly mounted on an injection molding apparatus or separated from the injection molding apparatus. The ignition unit 40 is preferably disposed in the mold and attached to the mold. In the ignition mold 40, the length of flames may be adjusted to be relatively long or relatively short using combustion gas such as gaseous fuel mixed with oxygen or compressed air.

In the air and gaseous fuel mixture and supply unit 90, the gaseous fuel must be mixed with the oxygen or compressed air for burning the gaseous fuel prior to the supply of the gaseous fuel and the oxygen or compressed air so as to completely burn the gaseous fuel in a forming space defined between two molds. Since the danger of explosion occurs when the gaseous fuel is kept in a state where the gaseous fuel is mixed with the oxygen or air, the gaseous fuel is mixed with the oxygen or air in the gaseous fuel mixture and supply element 92 for ignition and the gaseous fuel mixture and supply element 111 for heating in the process of supplying the gaseous fuel and the oxygen or air. The gaseous fuel and the oxygen or air are supplied to and mixed in the elements 92 and 111, and immediately the mixed gaseous fuel and the oxygen or air is supplied to the interior of the lower mold 30. In order to regulate the amount of the gaseous fuel and the amount of the oxygen or air, the manual valves 96, 104, 135 and 145 and the flux regulators 131 and 141 are employed. One is selected between the oxygen and the air, depending upon the material of the molded products. That is, the oxygen is employed for manufacturing relatively precise injection molding products of synthetic resin, while the compressed air is employed for manufacturing relatively rough injection molding products. While the oxygen or compressed air is supplied, impurities, such as humidity and dust, must be filtered off through the first filter 132. In the case of the gaseous fuel, various impurities must be filtered off through the second filter 142 and thereafter be supplied to the lower mold 30.

In the safety unit of the present invention, when it is sensed that the pressure of the gaseous fuel or the oxygen or air supplied through the pneumatic pressure gauge 93 or 112, the fluidic pressure gauge 101 or 120 or the pressure switch 134 or 144 is greater or less than a predetermined pressure, the related supply line 91, 110, 130 or 140 is stopped up by the solenoid valve 95, 103, 114, 122, 133 or 143, thereby preventing danger due to abnormal pressure. If the gas detector is mounted to the lower portion of the system of the present invention or on the ceiling of a room where the system of the present invention is installed, the supply of the gaseous fuel and oxygen or compressed air is interrupted when the leakage of gas is detected. Additionally, when the flame sensor 42 of the ignition unit 40 senses the failure of ignition and an accidental fire, the supply of the gaseous fuel and oxygen or compressed air is interrupted.

The safety unit and the gaseous fuel mixture and supply control 70 for controlling the air and gaseous fuel mixture and supply unit 90 allows their operating time period, position and numerical value to be set and controlled by means of the control panel 150.

EXAMPLE

Wheel caps for automobiles were injection-molded of polycarbonate/ABS alloy resin. The method for momentarily heating the surface of a mold using the flame of gaseous fuel and system thereof in accordance with the present invention was applied to the manufacture of the wheel caps. The molding pressure of the system was 405 tons. No resin weld line and no flow mark appeared on the exterior of the molded products. Additionally, pinholes that inevitably appear on the general products of polycarbonate/ABS alloy resin did not appear on the products of this example. Furthermore, the brilliance, impact strength and thermal deformation temperature of the products manufactured by the method and system were improved as described in table 1 in comparison with the products made by the conventional method and system.

TABLE 1

| | Product made by the conventional method and system | Product made by the method and system of the present invention |
|---|---|---|
| Brilliance (the angle of reflection: 60°) | 75 | 100 |
| Impact strength (⅛", notched ASTM D-256) (Kg · cm/cm) | 52 | 62 |
| Thermal deformation temperature (⅛", 1.80 N/mm² ASTM D-648) (°C.) | 123 | 141 |

As can be seen from the above example, since products of polycarbonate/ABS alloy resin having no defect in appearance can be manufactured in accordance with the present invention, wheel caps of superior quality can be manufactured without coating, thereby reducing its manufacturing cost and improving its quality.

Additionally, in accordance with the present invention, the strength and thermal properties of the products can be improved, and the resin of high strength can be freely formed regardless of its fluidity.

Meanwhile, in accordance with a feature of the present invention, the upper and lower molds 20 and 30 may be heated by an induction heater that generates high temperature heat using electricity instead of gaseous fuel. When the molds 20 and 30 are heated using gaseous fuel, heat is directly applied to the molds 20 and 30; whereas when the molds 20 and 30 are heated using an induction heater, electricity flows into the molds 20 and 30 by the action of induction and heat is generated in the molds 20 and 30 by the resistance of the molds 20 and 30. When the induction heater is employed to heat the molds 20 and 30, the constructions concerning the supply of gaseous fuel are not necessary. However, the constructions concerning the supply of compressed air for cooling the molds 20 and 30 are preferably provided.

That is, in the method and system of the present invention, the upper and lower molds 20 and 30 can be momentarily heated by heating means such as the induction heater.

Figure 7:
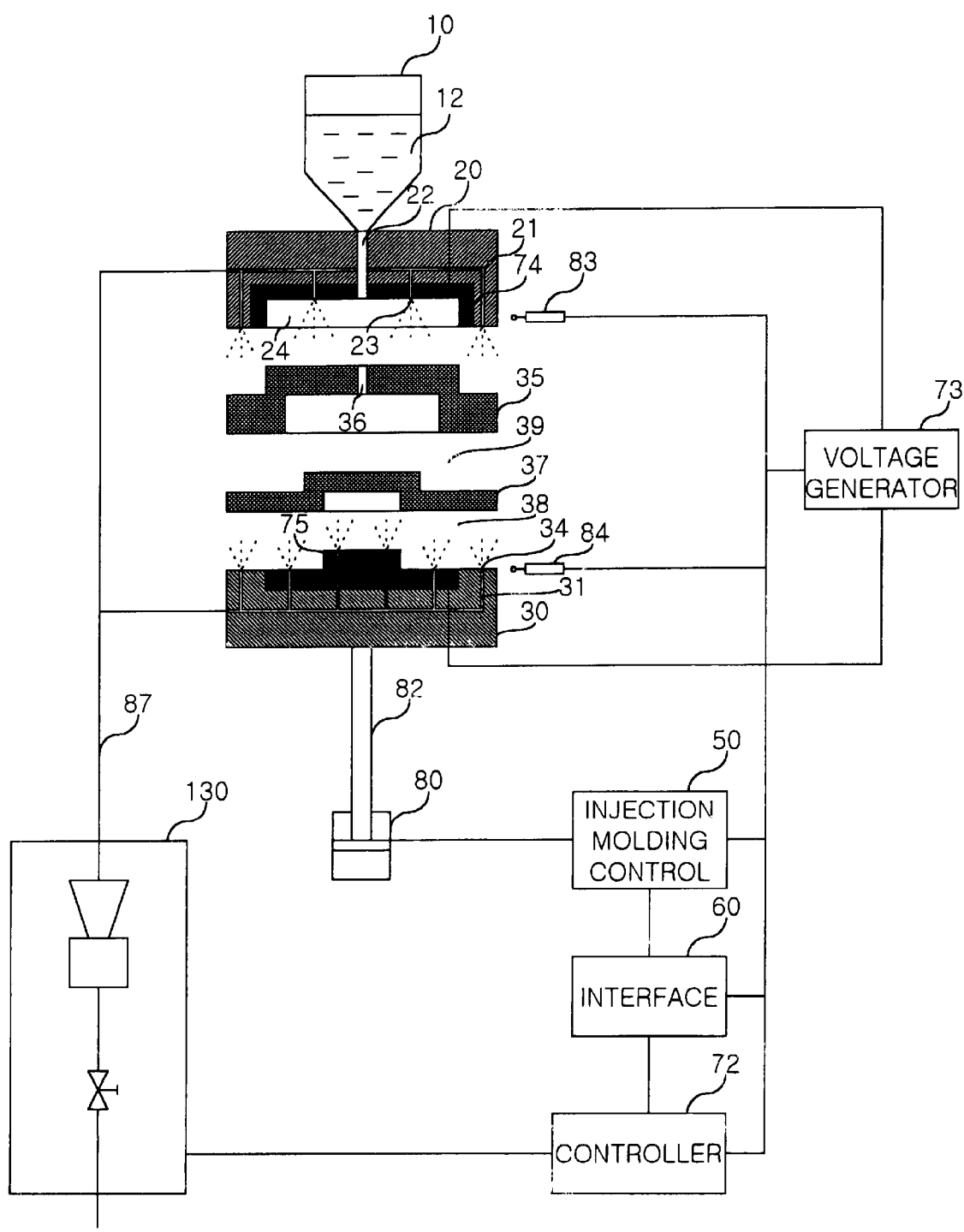
FIG. 7 is a schematic diagram showing a system for momentarily heating the surface of a mold using an induction heater in accordance with the present invention.

FIG. 7 is a schematic diagram showing a system for momentarily heating the surface of a mold that employs an induction heater and two cores. This system for momentarily heating the surface of a mold comprises a casting material feeder 10 for supplying molten casting material, upper and lower molds 20 and 30 for forming a predetermined shaped cast, an injection molding control 50 for controlling the upper and lower molds 20 and 30, a compressed air supply line 130 for supplying compressed air, one or more cores 35 and 37 disposed between the upper and lower molds 20 and 30, a voltage generator 73 for generating voltage of a predetermined level, induction heaters 74 and 75 for heating the cores 35 and 37 using current applied from the voltage generator 73, the induction heaters 74 and 75 being mounted on the inner portion of the upper mold 20 and the upper portion of the lower mold 30, a controller 72 for controlling the compressed air supply line 130 and the voltage generator 73, an interface 60 for interfacing the injection molding control 50 and the controller 72, and a control panel 150 for visually displaying the control, condition and operation of the components of the system.

The system further comprises a plurality of supply conduits 21 and 31 and a plurality of discharge holes 23 and 34 in the upper and lower molds 20 and 30. The supply conduits 21 and 31 are respectively connected to a compressed air supply conduit 87 for supplying compressed air provided by the compressed air supply line 130. The cores 35 and 37 respectively have thicknesses of 0.1 to 15 mm and are formed to correspond to the shape of the cast. The discharge holes 23 and 34 are constructed in the form of slits, respectively have widths of 0.01 to 5 mm and are distributed on the surfaces of the molds 20 and 30 to correspond to the shape of the cast.

When the induction heaters 74 and 75 are employed as heating means, the lower and upper molds 20 and 30 are momentarily heated using current generated by the voltage generator 73 and are cooled by means of compressed air of high pressure after injection molding, thereby producing injection-molded products.

Figure 8:
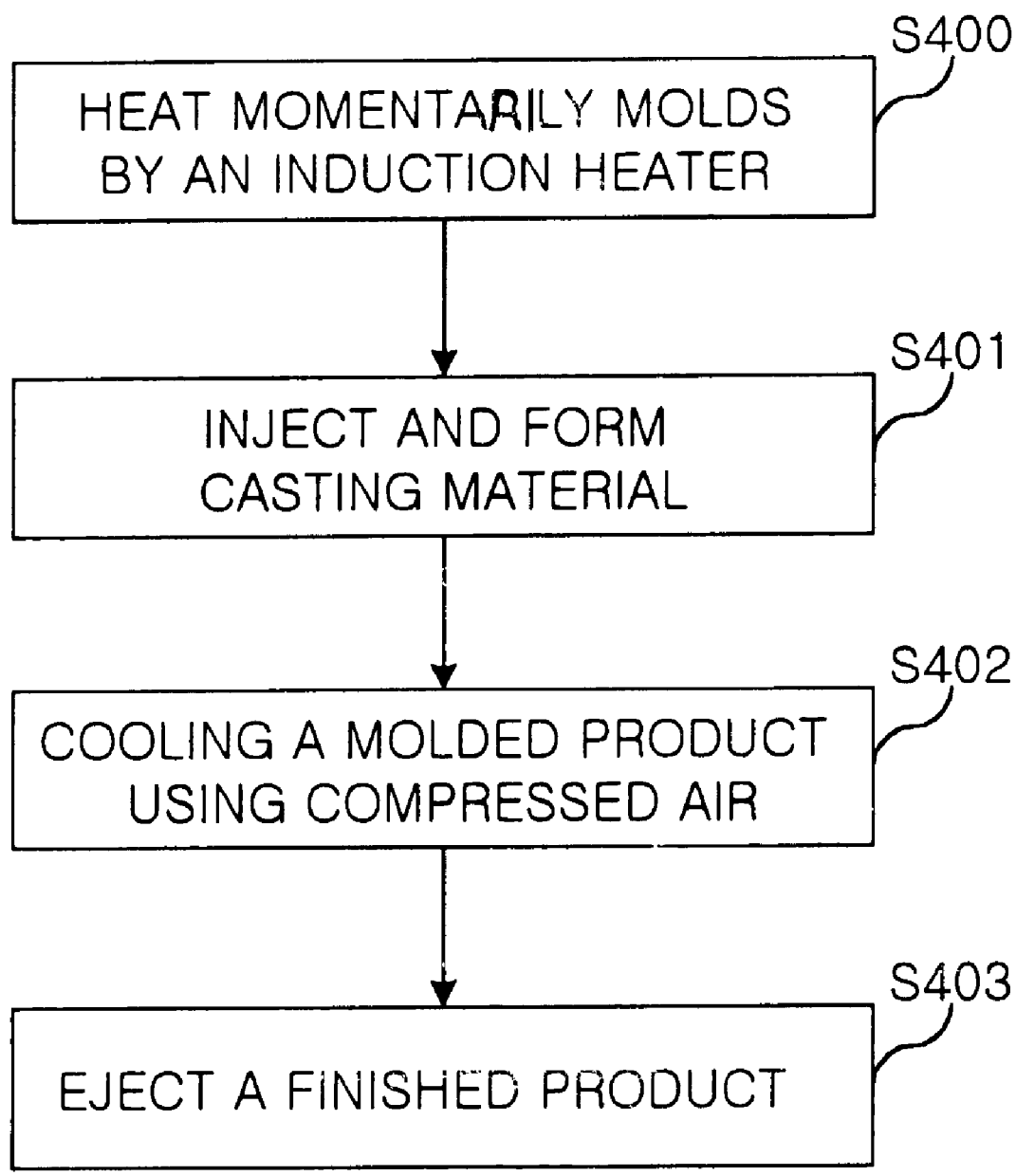
FIG. 8 is a flowchart showing the operation of the system for momentarily heating the surface of a mold using the induction heater.

FIG. 8 is a flowchart showing the operation of the system for momentarily heating the surface of a mold that employs the induction heaters 74 and 75 and the two cores 35 and 37. First of all, in STEP S400, the upper and lower molds 20 and 30 are momentarily heated by the induction heaters 74 and 75 using current generated by the voltage generator 73 after the upper and lower molds 20 and 30 are caused to come close to each other at a predetermined distance. In STEP S401, molten casting material is injected from the casting material feeder 10 and is molded after the heated lower mold 30 is raised to and engaged with the upper mold 20. In STEP S402, compressed air is supplied from a compressed air supply line 130 to the cores 35 and 37 through a compressed air supply line 87, the supply conduits 21 and 31 and the discharge holes 23 and 24, and cools the molded product. In STEP S403, the molded product is ejected after the molded product is cooled sufficiently.

A user can select one of the two heating fashions, that is, one heating fashion using gaseous fuel and the other heating fashion using an induction heater, depending upon the type or feature of the products to be injection-molded.

In the meantime, when the induction heaters 74 and 75 are employed, the injection molding control 50 and interface 60 for controlling the components of the system and a controller 72 for transmitting and receiving control signals are included in the system. The controller 72 includes a control program.

The method and system of the present invention is not limited to the injection molding of synthetic resin products, but the method and system can be applied to reactive injection molding, metallic cast forming and ceramic forming and the like.

As described above, the present invention provides a method for momentarily heating the surface of a mold and system thereof, which is capable of improving the quality of products in appearance, preserving the physical and thermal properties of resin in the products, increasing the productivity of the manufacturing process of the products and reducing the manufacturing cost of the products.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A system for momentarily heating the surface of a mold, comprising:
   a casting material feeder for supplying molten casting materials;
   upper and lower molds for forming a predetermined shaped cast;
   an injection molding control for controlling the upper mold and the lower mold;
   an air and gaseous fuel mixture and supply unit for supplying compressed air and gaseous fuel simultaneously or selectively;
   a gaseous fuel mixture and supply control for controlling the operation of the air and gaseous fuel mixture and supply unit;
   an interface for interfacing the injection molding control and the gaseous fuel mixture and supply control; and
   a control panel for visually displaying the control, condition and operation of the components of the system.

2. The system according to claim 1, wherein said upper mold has a casting material supply hole for supplying casting material from the casting material feeder to the upper mold and a cavity for forming the casting material into a predetermined-shaped cast, and is provided with a limit switch for sensing the position of the upper mold.

3. The system according to claim 1, wherein said lower mold comprises,
   a mold portion for insertion into the cavity of the upper mold to form the casting material into a predetermined-shaped cast,
   a lower mold supply conduit for supplying mixed gaseous, fuel and compressed air, said lower mold supply conduit being formed in the lower mold,
   a plurality of lower mold discharge holes for heating and cooling the upper mold using the mixed gaseous fuel and the compressed air supplied through the lower mold supply conduit,
   an ignition unit for igniting gaseous fuel injected by an igniter using high voltage current generated by a high voltage generator and sensing gaseous fuel flame by means of a flame sensor,
   a limit switch for sensing the position of the lower mold,
   an air and gaseous fuel mixture and supply unit for supplying air or mixed gaseous fuel supplied through a gaseous fuel supply conduit, and
   an elevating cylinder including an elevating shaft for selectively lifting or lowering the lower mold by the control of an injection molding control.

4. The system according to claim 3, wherein said discharge holes are constructed in the form of slits on the mold, respectively have widths of 0.01 to 0.1 mm, and are distributed on the surface of the lower mold to correspond to the shape of the cast.

5. The system according to claim 3, further comprising a safety unit, said safety unit automatically interrupting the supply of air and gaseous fuel when a flame is not sensed by the flame sensor in a predetermined time period after ignition is performed by the igniter of the ignition unit, gas of a predetermined degree of density is detected by a gas detector disposed near the upper and lower molds, or the pressure of air and gaseous fuel inputted from a first pressure switch and a second pressure switch are higher than a predetermined pressure.

6. The system according to claim 3, wherein said air and gaseous fuel mixture and supply unit comprises:
   an air and gaseous fuel supply line for ignition including an air and gaseous fuel mixture element for ignition, an air supply line for ignition and a gaseous fuel supply line for ignition,
   said air supply line for ignition including,
      a first pneumatic pressure gauge for measuring the pressure of supplied air,
      a first needle valve for preventing compressed air from flowing backward, and
      a first solenoid valve for interrupting the supply of compressed air and a first manual valve for regulating the amount of supplied compressed air,
   said gaseous fuel supply line for ignition including,
      an first fluidic pressure gauge for measuring the pressure of supplied gaseous fuel,
      a second needle valve for preventing gaseous fuel from flowing backward, and
      a second solenoid valve for interrupting the supply of gaseous fuel and a second manual valve for regulating the amount of supplied gaseous fuel;
   an air and gaseous fuel supply line for heating including an air and gaseous fuel mixture element for heating, an air supply line for heating and a gaseous fuel supply line for heating,
   said air supply line for heating including,
      a second pneumatic pressure gauge for measuring the pressure of supplied air,
      a third needle valve for preventing compressed air from flowing backward, and
      a third solenoid valve for interrupting the supply of compressed air and a first pressure switch for sensing the pressure of supplied compressed air and interrupting the supply of compressed air when the pressure of the supplied compressed air is not equal to a predetermined value,
   said gaseous fuel supply line for heating includes,
      an second fluidic pressure gauge for measuring the pressure of supplied gaseous fuel, a fourth needle valve for preventing gaseous fuel from flowing backward, and a fourth solenoid valve for interrupting the supply of gaseous fuel and a second pressure switch for sensing the pressure of supplied compressed air and interrupting the supply of gaseous fuel when the pressure of the supplied gaseous fuel is not equal to a predetermined value;

a compressed air supply line connected to both air supply line for ignition of the air and gaseous fuel supply line for ignition and the air supply line for heating of the air and gaseous fuel supply line for heating, said compressed air supply line including,
- a first flux regulator for manually regulating the amount of compressed air,
- a first filter for filtering impurities included in compressed air,
- a fifth solenoid valve for interrupting the supply of compressed air,
- a third pneumatic pressure gauge for sensing the pressure of supplied compressed air, and
- a fifth manual valve for regulating the amount of supplied compressed air;

a gaseous fuel supply line connected to both the gaseous fuel supply line for ignition of the air and gaseous fuel supply line for ignition and the gaseous fuel supply line for heating of the air and gaseous fuel supply line for heating, said fuel gas supply line including,
- a second flux regulator for manually regulating the amount of gaseous fuel,
- a second filter for filtering impurities included in gaseous fuel,
- a sixth solenoid valve for interrupting the supply of gaseous fuel,
- a fourth pneumatic pressure gauge for sensing the pressure of supplied gaseous fuel, and
- a sixth manual valve for regulating the amount of supplied gaseous fuel;

a compressed air supply source for supplying compressed air, said compressed air supply source being connected to the compressed air supply line; and a gaseous fuel supply source for supplying gaseous fuel, said gaseous fuel supply source being connected to the gaseous fuel supply line.

7. The system according to claim 1, wherein said control panel comprises,
- a key input unit for inputting various operational conditions for injection molding,
- a sensing unit for sensing the various states of the system, converting a sensing signal to an electric signal and outputting the electric signal,
- a central processing unit for performing determination on the basis on an input signal and outputting a control signal,
- an alarm for warning of the error of the system and the danger of safety,
- a display for indicating the information of the operation of the system, and
- an instrument panel for indicating the operation of various components of the system.

8. The system according to claim 1, further comprising,
one or more cores disposed between the upper and lower molds,
- a upper mold supply conduit for supplying mixed gaseous fuel and compressed air, said upper mold supply conduit being formed in the upper mold,
- a plurality of upper mold discharge holes for heating and cooling the cores using the mixed gaseous fuel and the compressed air supplied through the upper mold supply conduit,
- a lower mold supply conduit for supplying mixed gaseous fuel and compressed air, said lower mold supply conduit being formed in the lower mold,
- a plurality of lower mold discharge holes for heating and cooling the cores using the mixed gaseous fuel and the compressed air supplied through the lower mold supply conduit, and
- a gaseous fuel supply conduit for connecting the air and gaseous fuel mixture and supply unit respectively to the upper mold supply conduit and the lower mold supply conduit.

9. The system according to claim 8, wherein said cores respectively have thicknesses of 0.1 to 15 mm and are respectively formed in accordance with the shape of the cast, and said discharge holes are constructed in the form of slits, respectively have widths of 0.01 to 5 mm and are distributed on the surface of the mold in accordance with the shape of the cast.

10. The system according to claim 8, wherein said cores consist of a first core in contact with the upper mold and a second core in contact with the lower mold, a first casting material supply hole is formed in the first core to correspond to a second casting material supply hole in the upper mold, and a forming space is formed between the first and second cores to form casting material supplied through the first casting material supply hole of the first core.

\* \* \* \* \*